No. 789,024. PATENTED MAY 2, 1905.
J. M. HIBBARD & A. C. McCORD.
AUTOMATIC TIRE CHARGING PUMP.
APPLICATION FILED OCT. 3, 1904.

3 SHEETS—SHEET 1.

Witnesses
A. H. Opsahl
Harry D. Kelzer

Inventors
James M. Hibbard
A. C. McCord
By their Attorneys
Williamson Merchant

No. 789,024. PATENTED MAY 2, 1905.
J. M. HIBBARD & A. C. McCORD.
AUTOMATIC TIRE CHARGING PUMP.
APPLICATION FILED OCT. 3, 1904.

3 SHEETS—SHEET 2.

Witnesses.
A. H. Opsahl.
Harry D. Kilgore.

Inventor.
James M. Hibbard
A. C. McCord
By their Attorneys
Williamson Merchant

No. 789,024.

Patented May 2, 1905.

UNITED STATES PATENT OFFICE.

JAMES M. HIBBARD AND ALVIN C. McCORD, OF CHICAGO, ILLINOIS.

AUTOMATIC TIRE-CHARGING PUMP.

SPECIFICATION forming part of Letters Patent No. 789,024, dated May 2, 1905.

Application filed October 3, 1904. Serial No. 226,945.

*To all whom it may concern:*

Be it known that we, JAMES M. HIBBARD and ALVIN C. McCORD, citizens of the United States, residing at Chicago, in the county of Cook and State of Illinois, have invented certain new and useful Improvements in Automatic Tire-Charging Pumps; and we do hereby declare the following to be a full, clear, and exact description of the invention, such as will enable others skilled in the art to which it appertains to make and use the same.

Our invention has for its object to provide simple and efficient air-pump mechanism which will operate under the rotation of a wheel to maintain a desired air-pressure in the pneumatic tire thereof; and to such ends it consists of the novel devices and combinations of devices hereinafter described, and defined in the claims.

The invention is illustrated in the accompanying drawings, wherein like characters indicate like parts throughout the several views.

Figure 1:
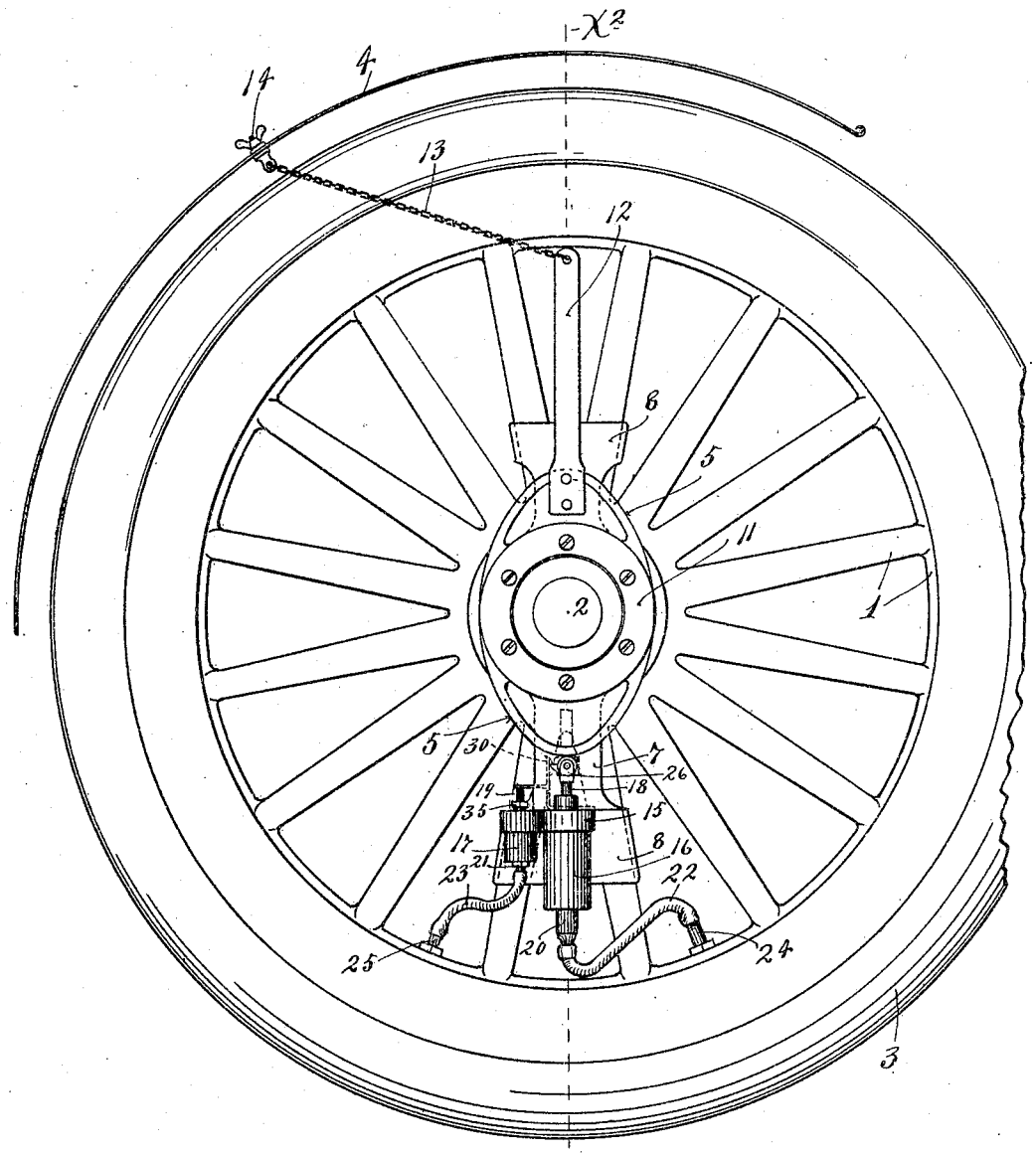
Figure 2:
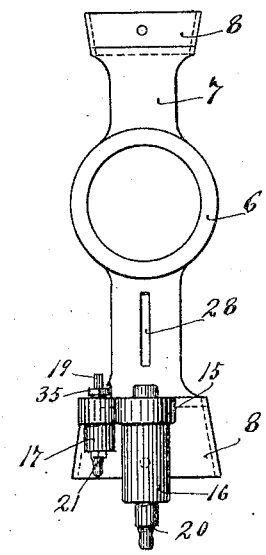
Figure 3:
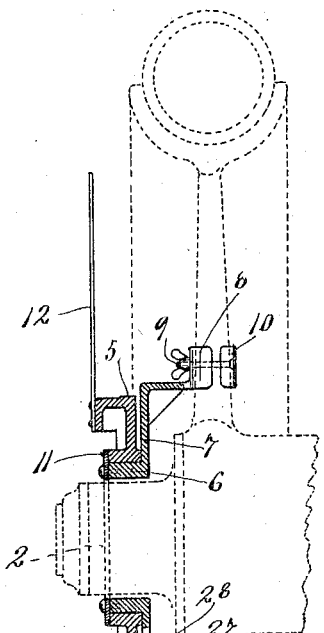
Figure 4:
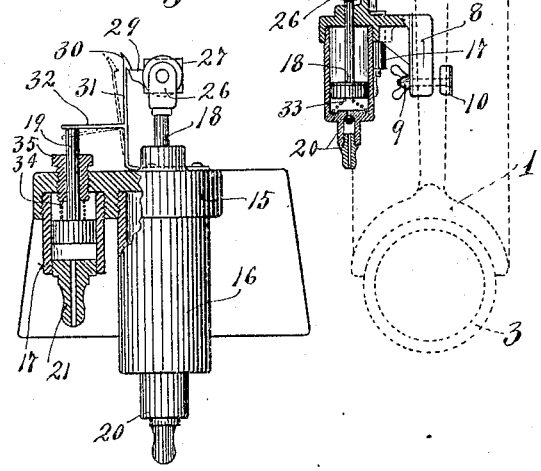
Figure 5:
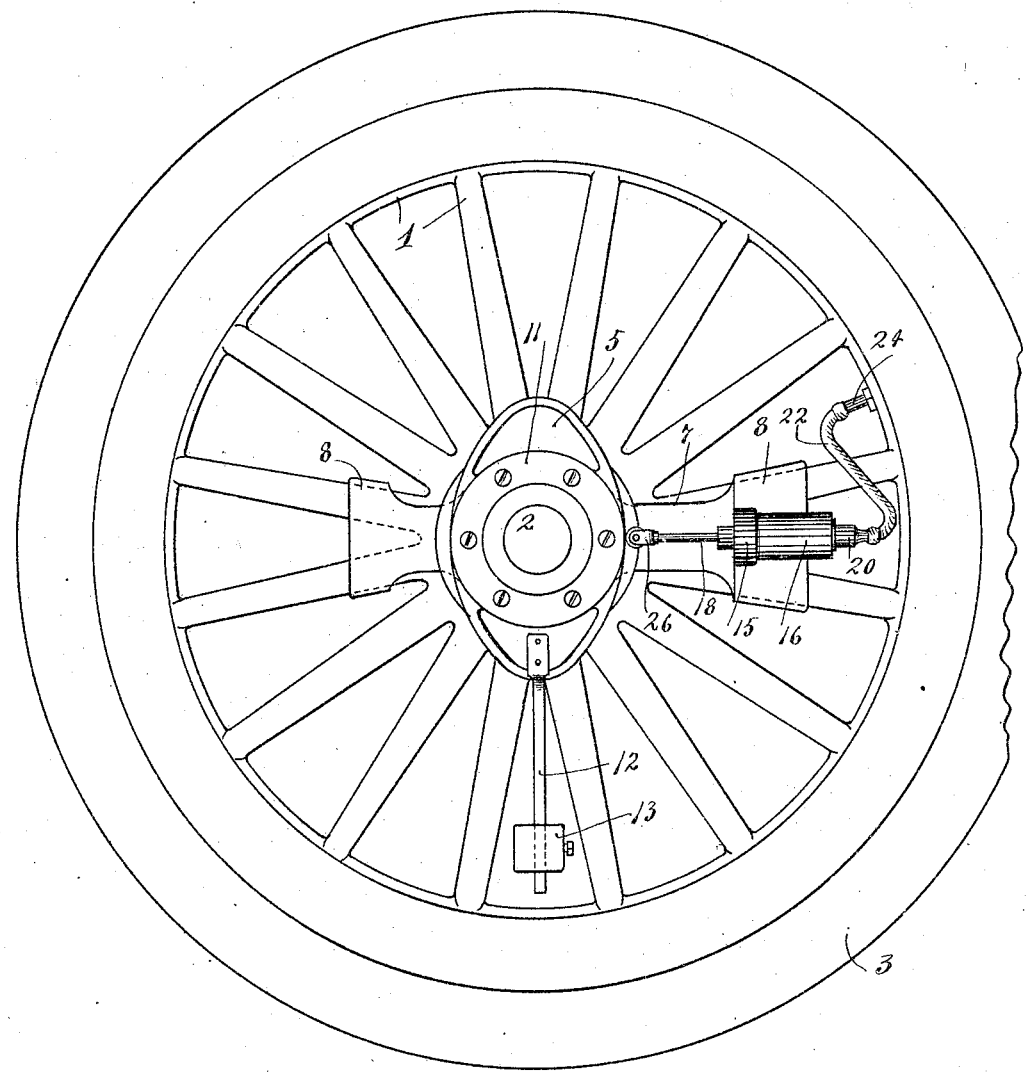

Figure 1 is a view in side elevation with parts broken away, illustrating one form of our invention applied in operative position to the wheel of a vehicle, such as that of an automobile. Fig. 2 is a vertical section taken approximately on the line $x^2 \ x^2$ of Fig. 1, the wheel being indicated only by dotted lines. Fig. 3 is a detail view showing portions of the air-pump of the pneumatic controller and means for securing the same to the spokes of the wheel. Fig. 4 is an enlarged view, partly in section and partly in elevation, showing the principal portions of the air-pump and of the pneumatic controller which coöperates therewith; and Fig. 5 is a view corresponding to Fig. 1, but illustrating a modified construction.

The numeral 1 indicates the body of the wheel, the same having the usual hub 2 and pneumatic tire 3.

As shown in Fig. 1, the numeral 4 indicates one of the mud-guards, which overlies the wheel and is in practice rigidly secured to the body of the vehicle.

Referring now to the construction illustrated in Figs. 1 to 4, inclusive, the numeral 5 indicates a cam which is loosely mounted on the annular hub 6 of a bearing-bracket 7. The bearing-bracket 7 on opposite sides of the hub of the wheel is provided with feet 8, that are rigidly clamped to the spokes of the wheel by nutted bolts 9 and coöperating clips 10. The bearing-sleeve 6 of said bracket loosely surrounds the outwardly-projecting portion of the wheel-hub 2 and is provided with a rigidly but detachably secured annular retaining-ring 11, that holds the cam 5 against lateral displacement. The said cam 5 is provided with a radially-projecting arm 12, which, as shown, is connected to the guard 4 by a chain 13 and an anchoring-bolt 14. The said cam is thus anchored against rotation with the wheel. As shown, the said cam is formed with bulging cam-surfaces at diametrically opposite points; but it may be provided with any desired number (one or more) of such bulging cam-surfaces. In the construction at present under consideration a double piston-head 15 is integrally cast as part of one of the feet of the bracket 7 and affords a head for a relatively large pump-cylinder 16 and for a relatively small cylinder 17. Working in the cylinder 16 is a piston 18, and working in the cylinder 17 is a piston 19. The said cylinders 16 and 17 at their outer ends are provided with heads 20 and 21, that terminate in nipples, to which, as shown, are attached flexible air-tubes 22 and 23, respectively. The outer end of the tube 22 leads from the stem or nipple of a tire-charging valve 24, which charging-valve may be of the usual or any suitable construction. The outer end of the tube 23 leads to a nipple 25, which is in communication with the interior chamber of the tire. Secured to the outer end of the stem of the pump-piston 18 is a roller-equipped head 26, the roller of which stands in the plane of the cam 5. Said head 26 is, as shown, provided with a laterally-projecting stud or guide-pin 27, that works as a cross-head in the guide-slot 28 of the bracket 7. Said head 26 is further provided with a latch-lug 29, that coöperates with the hooked free end 30 of a spring-latch 31, which latch, as shown, is riveted at its base end to the cylinder-head 15 and is provided with a laterally-projecting finger 32. The spring tension of the latch 31 is such that it tends to stand in inoperative dotted-line position, (shown in Fig. 4,) and its finger 32 always stands in the path of movement of the stem of the piston 19, which works in the cylinder 17. A spring 33 in the pump-cylinder 16 tends to force the pump-piston 18 toward the axis of the wheel, while a spring 34 in the cylinder 17 tends to force the piston 19 away from the axis of the wheel. Said spring 34 reacts against a bushing 35, which surrounds the stem of the piston 19 and has screw-threaded engagement with and works through the cylinder-head 15. By adjustments of the sleeve 35 the tension of the spring 34 may be varied, so that it will require any desired pressure from within the tire to force the piston 19 outward into an operative position. (Shown by full lines in Fig. 4.) Whenever the pressure within the tire is by leakage reduced below a predetermined point per square inch, determined by the tension put upon the spring 34, the said spring will force the piston 19 outward from the axis of the wheel, and the spring-latch 31 will stand in an inoperative position. (Indicated by dotted lines in Fig. 4.) When the said latch is in this position, the pump-piston 18 is free to oscillate and under each rotation of the wheel will, as is evident, under the conjoint action of the spring 33 and cam 5 be given two complete working strokes. The said spring 33 of course projects the roller carried by the rod of the piston 18 into the space included by a circle struck from the axis of the wheel and circumscribing the outer portions of said cam, so that the said roller will travel over said cam, and the pump will continue to operate and force air into the tire as long as the said pump-piston is free to move. When, however, the pressure in the tire exceeds the predetermined limit determined by the tension of the spring 34, the controller-piston 19 will be forced inward or toward the axis of the wheel and acting on the finger 32 of the spring-latch 31 will force the said spring-latch into an operative position, (indicated by full lines in Fig. 4,) whereupon at the first following outward movements of the pump-piston 18 the hooked end of said latch 31 will engage the latch-lug 29, which is carried by the pump-piston stem and will thereby lock said pump-piston in a position in which it will not be acted upon by the cam under the rotation of the wheel. As is obvious, as soon as the pressure in the tire is reduced below the predetermined pressure the spring 34 will again become active to throw the controller-piston 19 radially outward from the axis of the wheel, permitting the spring 31 to move into an inoperative position, and thereby releasing the pump-piston and throwing the pump again into action. Thus the pump is automatically thrown into action and out of action at the proper times to maintain the desired pressure within the tire.

In the construction illustrated in Fig. 5 the cam 5 is free to rotate; but its arm 12 is provided with a weight 13, which tends to hold the cam in the position indicated in said view. In this construction of course the pneumatic controller is dispensed with and the roller at the outer end of the pump-piston maintains constant engagement with said cam. The weight 13 will hold the cam against rotation until the pressure within the tire offers such resistance to the movement of the pump-piston that the said cam and its weighted arm are caused to rotate with the wheel. As is evident, when the cam rotates with the wheel the pump-piston will not be operated.

From what has been said it will be understood that the automatic tire-pumping mechanism herein described is capable of a large range of modification within the scope of our invention as herein set forth and claimed.

The tire-inflating device above described is adapted to be quickly applied to and to be removed from the wheel of a vehicle having a pneumatic tire.

The cam 5 in the construction described is one form of "pump-actuator," and this pump-actuator, it will be understood, may take various forms. A crank and rod or an ordinary eccentric and strap would also serve as pump-actuators and would be within the broad meaning of the term "pump-actuator" as used in this specification and in the claims. Both the pump and its actuator are mounted on the detachable bearing bracket or support and are removable therewith from the wheel and are applicable therewith to the wheel, so that the said parts may be removed or applied by one operation and can never get out of operative positions with respect to each other.

In practice one tire-inflating device is all that will be required for one vehicle, as the said device is adapted for application to any one of the wheels thereof, and it is not at all probable that two tires of the vehicle would be punctured on the same trip or run. In short, the inflating device is intended for application to the wheel only in case of puncture of the tire thereof.

What we claim, and desire to secure by Letters Patent of the United States, is as follows:

1. A tire-inflating device comprising a support detachably securable to the wheel, a pump mounted on said detachable support, a pump-actuator also mounted on said support, and means for anchoring said pump-actuator against rotation with the wheel, said support, pump and pump-actuator being together applicable to the wheel and together removable from the wheel, substantially as described, 2. The combination with a wheel having a pneumatic tire, of a support secured to said wheel for rotation therewith, a pump mounted on said support and communicating with said tire, and a pump-actuator mounted on said support and anchored against rotation, substantially as described.

3. A tire-inflating device comprising a support securable to a wheel, a pump mounted on said support, and a pump-actuating cam mounted on said support and provided with means for anchoring it against rotation, substantially as described.

4. The combination with a wheel having a pneumatic tire, of a support detachably secured to said wheel for rotation therewith, a pump mounted on said support, and a pump-actuating cam mounted on said support and provided with means for anchoring it against rotation, said support, pump and actuating-cam being together applicable to the wheel and together removable from the wheel, substantially as described.

In testimony whereof we affix our signatures in presence of two witnesses.

JAMES M. HIBBARD.
    ALVIN C. McCORD.

Witnesses:
 C. J. COPELAND,
 M. SCOTT.